United States Patent
Morii

(10) Patent No.: US 10,877,527 B2
(45) Date of Patent: Dec. 29, 2020

(54) ELECTRONIC APPARATUS, METHOD OF CONTROLLING THE SAME, AND STORAGE MEDIUM

(71) Applicant: CANON KABUSHIKI KAISHA, Tokyo (JP)

(72) Inventor: Takashi Morii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/376,933

(22) Filed: Apr. 5, 2019

(65) Prior Publication Data

US 2019/0332147 A1 Oct. 31, 2019

(30) Foreign Application Priority Data

Apr. 27, 2018 (JP) .................. 2018-086495

(51) Int. Cl.
| | | |
|---|---|---|
| *G06F 1/16* | (2006.01) | |
| *G06F 9/30* | (2018.01) | |
| *H01Q 1/24* | (2006.01) | |

(52) U.S. Cl.
CPC .............. *G06F 1/1698* (2013.01); *G06F 1/16* (2013.01); *G06F 1/1656* (2013.01); *G06F 1/1686* (2013.01); *G06F 9/30* (2013.01); *G06F 9/3004* (2013.01); *H01Q 1/24* (2013.01); *H01Q 1/243* (2013.01)

(58) Field of Classification Search
CPC ........ H01Q 1/243; H01Q 1/24; G06F 1/1698; G06F 9/3004; G06F 1/1686; G06F 1/1656; G06F 1/16; G06F 9/30; H04W 36/14; H04B 7/0617

USPC .......................................... 343/702
See application file for complete search history.

(56) References Cited

U.S. PATENT DOCUMENTS

| | | | | |
|---|---|---|---|---|
| 2012/0050035 | A1* | 3/2012 | Morii ................. | G01S 19/34 340/539.13 |
| 2012/0239308 | A1* | 9/2012 | Miller ................. | G01N 1/2252 702/24 |
| 2015/0245298 | A1* | 8/2015 | Takahashi ......... | H04W 52/0254 455/574 |
| 2017/0142241 | A1* | 5/2017 | Kim .................... | H04M 1/026 |
| 2017/0317729 | A1* | 11/2017 | Kobayashi .......... | H04B 7/0632 |
| 2017/0332298 | A1* | 11/2017 | Takagi ................ | H04M 1/7253 |
| 2018/0069395 | A1* | 3/2018 | Morii .................. | H01B 7/36 |

FOREIGN PATENT DOCUMENTS

JP 2010-124603 A 6/2010

* cited by examiner

*Primary Examiner* — Hai V Tran
(74) *Attorney, Agent, or Firm* — Canon U.S.A., Inc. IP Division

(57) ABSTRACT

An electronic apparatus includes a support unit, a movement unit that moves an apparatus supported by the support unit, a communication unit, and a control unit. In a case where a connection for wireless communication to a communication apparatus is established via the communication unit, the control unit controls the movement unit to move the apparatus supported by the support unit. The control unit controls the communication unit to receive information about movement of the communication apparatus from the communication apparatus. The control unit determines whether the support unit is supporting the communication apparatus based on the information about the movement of the communication apparatus.

14 Claims, 12 Drawing Sheets

ELECTRONIC APPARATUS, METHOD OF CONTROLLING THE SAME, AND STORAGE MEDIUM

BACKGROUND

Field

The present disclosure relates to an electronic apparatus capable of moving a communication apparatus.

Description of the Related Art

There has been a conventional technique in which a communication apparatus including an image capturing unit is supported by an electronic apparatus including an instruction member and the electronic apparatus transmits power to the communication apparatus to thereby move the communication apparatus. Japanese Patent Application Laid-Open No. 2010-124603 discusses a movement apparatus including a spherical mobile body that includes an image capturing unit and is adopted as a communication apparatus, and a movement control unit that moves a supported mobile body by using a vibrator and is adopted as an electronic apparatus.

When the communication apparatus is a spherical mobile body including an image capturing unit as described above, wireless communication is desirably used for data communication between the communication apparatus and the electronic apparatus so as to increase the range in which the communication apparatus can be moved. When the communication apparatus includes an image capturing unit, the communication apparatus is desirably configured to be replaceable so that an optimum lens can be selected depending on, for example, a scene to be captured.

In wireless communication, apparatuses use wireless communication standards such as a wireless local area network (LAN) or Bluetooth®. In such wireless communication standards, apparatuses generally perform authentication processing on each other and establish a connection by wireless communication. In this case, each apparatus records an identifier of a partner apparatus with which the apparatus is communicating, thereby making it possible to automatically establish a connection when the apparatus performs wireless communication with the same partner apparatus again.

In an apparatus in which one of a plurality of replaceable communication apparatuses and an electronic apparatus that supports the communication apparatus perform wireless communication, the electronic apparatus can record identifiers of a plurality of communication apparatuses. However, for example, when a connection is established by wireless communication between the electronic apparatus and the communication apparatus supported by the electronic apparatus, such a situation can be assumed where another communication apparatus that is not supported by the electronic apparatus is located at a distance close enough for the other communication apparatus to be connected to the electronic apparatus. In this situation, when the electronic apparatus is going to automatically establish wireless communication with the communication apparatus, the electronic apparatus can be connected to another communication apparatus located near the electronic apparatus, instead of connecting to the communication apparatus supported by the electronic apparatus. As a result, there is a possibility that a connection cannot be established by wireless communication as intended by a user in a case where one of a plurality of replaceable communication apparatuses and an electronic apparatus that supports the communication apparatus perform wireless communication.

SUMMARY

According to an aspect of the present disclosure, an electronic apparatus includes a support unit, a movement unit configured to move an apparatus supported by the support unit, a communication unit, and a control unit. In a case where a connection for wireless communication to a communication apparatus is established via the communication unit, the control unit controls the movement unit to move the apparatus supported by the support unit. The control unit controls the communication unit to receive information about movement of the communication apparatus from the communication apparatus. The control unit determines whether the communication apparatus is supported by the support unit based on the information about the movement of the communication apparatus.

Further features will become apparent from the following description of exemplary embodiments with reference to the attached drawings.

DESCRIPTION OF THE EMBODIMENTS

Modes for carrying out the present disclosure will be described in detail with reference to the accompanying drawings.

Each of exemplary embodiments described below is an example of implementing features of the present disclosure, and can appropriately be modified or altered based on the configuration and various conditions of an apparatus to which the present disclosure is applied. The exemplary embodiments can be combined as appropriate.

Figure 1:
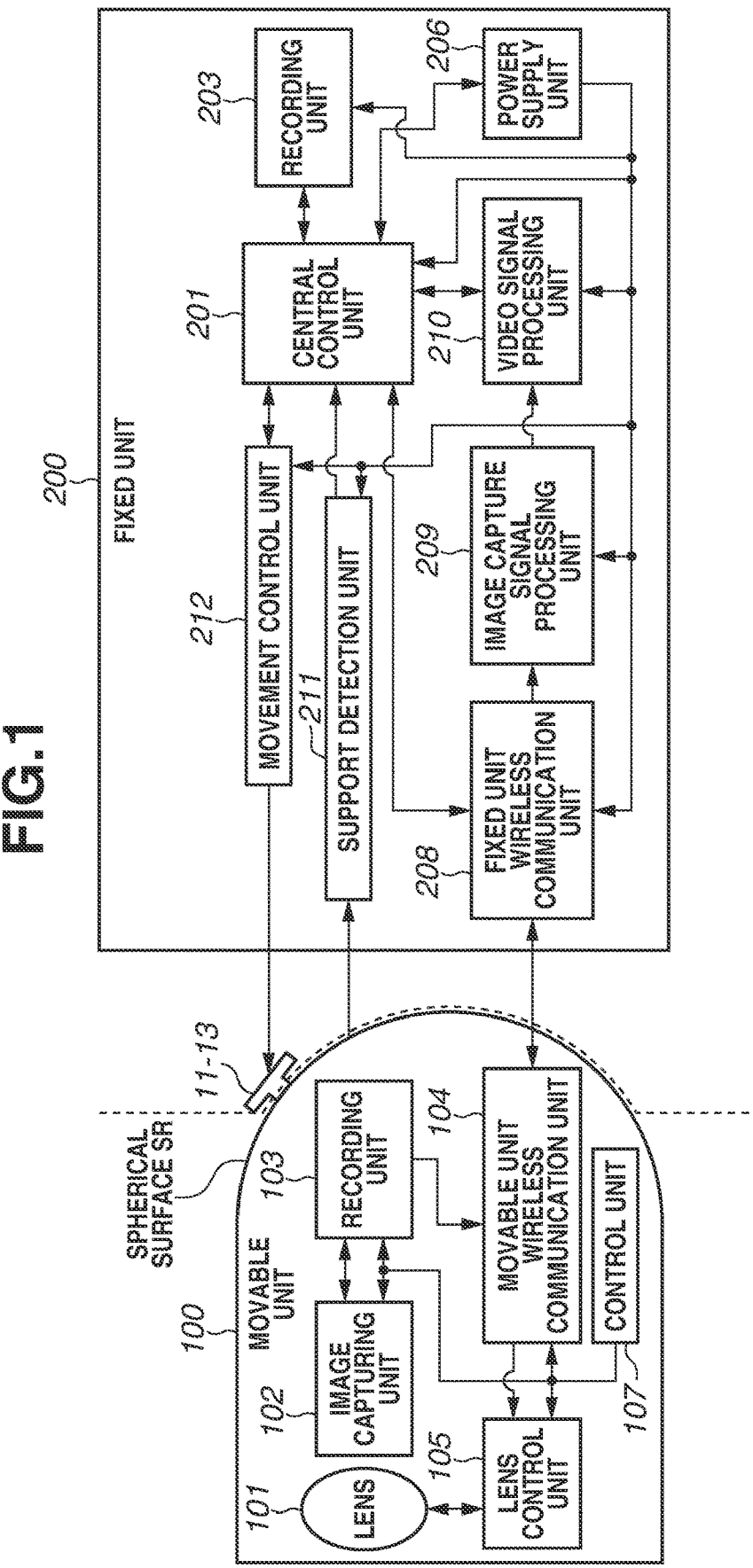
FIG. 1 is a block diagram illustrating an example of an electronic apparatus including a movable unit and a support member according to a first exemplary embodiment.

FIG. 1 is a block diagram illustrating an example of an apparatus including a movable unit and a support member according to a first exemplary embodiment. In the apparatus illustrated in FIG. 1, the movable unit is an example of a communication apparatus and the support member is an example of an electronic apparatus. Referring to FIG. 1, a movable unit 100 is a communication apparatus including a lens 101 and an image capturing unit 102. A support member 200 is an electronic apparatus including a support unit that supports the movable unit 100, and vibrators that control movement.

The movable unit 100 is attachable to and detachable from the support unit of the support member 200. At least a part of an outer surface of the movable unit 100 has a spherical shape (hereinafter referred to as a spherical surface SR).

The support member 200 includes a central control unit 201 that controls the vibrators that move the movable unit 100, the units of the electronic apparatus. Vibrators 11 to 13 each including a piezoelectric element are provided on the support member 200 in such a manner that the vibrators 11 to 13 are in pressure contact with the spherical surface SR of the movable unit 100. For example, vibration wave motors are used as the vibrators 11 to 13. The vibrators 11 to 13 are used to move the movable unit 100. Each of the vibrators 11 to 13 is not limited to a vibrator including a piezoelectric element, but instead may be a movement member capable of moving the movable unit 100. The support member 200 is designed such that the movable unit 100 can be replaced with a mobile body having, a structure similar to that of the movable unit 100. Accordingly, a user can select an appropriate communication apparatus depending on, for example, a scene to be captured.

The configuration of the movable unit 100 will now be described. In the movable unit 100, a power supply unit (not illustrated) supplies power to each unit.

The lens 101 is an image capturing optical system including a zoom unit, an aperture/shutter unit, and a focus unit.

The image capturing unit 102 includes an image sensor for converting light (video image) introduced through the lens 101 into an electrical video signal. As the image sensor, a complementary metal oxide semiconductor (CMOS) sensor, a charge-coupled device (CCD) sensor, or the like is generally used. The image capturing unit 102 is controlled by a control unit 107 in the movable unit 100 to convert object light focused by the lens 101 into an electrical signal by using the image sensor, perform noise reduction processing or the like, and output digital data as image data. In the present exemplary embodiment, a series of processing for capturing and outputting the image data is referred to as "image capturing".

A recording unit 103 is an electrically erasable/recordable nonvolatile memory, and stores programs to be described below which are executed by the control unit 107. The recording unit 103 records captured image data output from the image capturing unit 102. The recording unit 103 can output the recorded captured image data to a movable unit wireless communication unit 104.

The movable unit n wireless communication unit 104 includes, for example, an antenna for wireless communication, a modulation/demodulation circuit for processing a wireless signal, and a communication controller. The movable unit wireless communication unit 104 performs wireless communication with a support member wireless communication unit 208 to be described below. For example, in a case where the movable unit wireless communication unit 104 transmits captured image data to the support member 200 by wireless communication, the movable unit wireless communication unit 104 transmits the captured image data, for example, in chronological order of recording of data on the recording unit 103. The movable unit wireless communication unit 104 outputs the modulated wireless signal from the antenna, and demodulates the wireless signal received through the antenna, thereby performing wireless communication with the support member wireless communication unit 208 in accordance with IEEE 802.15 standard (i.e., so-called Bluetooth®). In the present exemplary embodiment, specifications such as Bluetooth® Low Energy defined in Bluetooth® version 4.0 and subsequent versions are adopted for Bluetooth® communication. The communication method is not limited to Bluetooth®, but also includes a so-called wireless local area network (LAN) communication method based on IEEE 80111 standard. Bluetooth® Low Energy communication has a smaller communicable range (i.e., a shorter communicable distance) than wireless LAN communication, and the communication speed of Bluetooth® Low Energy communication is lower than that of wireless LAN communication. On the other hand, Bluetooth® Low Energy communication consumes less power than wireless LAN communication.

A lens control unit 105 includes an integrated circuit (IC) that controls a motor driver. The lens control unit 105 controls, for example, the zoom unit, the aperture/shutter unit, and the focus unit of the lens 101. The lens control unit 105 performs control processing based on signals related to the operation of the lens 101 and received from the support member 200 by using the movable unit wireless communication unit 104.

The control unit 107 controls each unit of the movable unit 100 in accordance with input signals and programs to be described below. Instead of controlling each unit of the movable unit 100 by the control unit 107, the processing may be shared by plurality of pieces of hardware to control the movable unit 100.

The configuration of the support member 200 will now be described.

The central control unit 201 controls each unit of the support member 200 and the movable unit 100 in accordance with input signals and programs to be described below. The central control unit 201 can transmit an instruction for controlling the movable unit 100 to the movable unit 100 by using the support member wireless communication unit 208 to be described below. Instead of controlling each unit of the support member 200 by the central control unit 201, the processing may be shared by a plurality of pieces of hardware to control the support member 200.

A recording unit 203 is an electrically erasable/recordable nonvolatile memory, and stores programs and the like to be described below which are executed by the central control unit 201. The recording unit 203 records various types of data including video image information obtained by capturing images.

A power supply unit 206 can supply power to each element of the support member 200.

The support member wireless communication unit 208 performs wireless communication with the movable unit wireless communication unit 104. For example, the support member wireless communication unit 208 performs wireless communication to, for example, receive captured image data obtained by the image capturing unit 102, and transmit signals related to the operation of the lens 101.

An image capture signal processing unit 209 converts an electrical signal captured image data) output from the support member wireless communication unit 208 into a video signal.

A video signal processing unit 210 performs modification processing on the video signal output from the image capture signal processing unit 209 depending on the intended use. The modification processing to be performed on the video signal includes an electronic image stabilization operation by image cut-out processing or image rotation processing.

A support detection unit 211 includes, for example, an image sensor, such as a CMOS sensor, and a luminous body. For example, the support detection unit 211 uses the image sensor to detect reflection of light emitted from the luminous body, thereby detecting that the movable unit 100 is supported by the support member 200.

A movement control unit 212 controls the orientation of the movable unit 100 by causing the plurality of vibrators 11 to 13 to operate. The movement control unit 212 applies a voltage to the piezoelectric element of each of the vibrators 11 to 13 so as to cause the movable unit 100 to rotationally move (roll). Some or all of the vibrators 11 to 13 are caused to operate, as needed, by the movement control unit 212, thereby achieving the rotational movement of the movable unit 100 in all directions. Although the rotational movement is described in the present exemplary embodiment, a movement such as a linear movement may be achieved.

Figure 2:
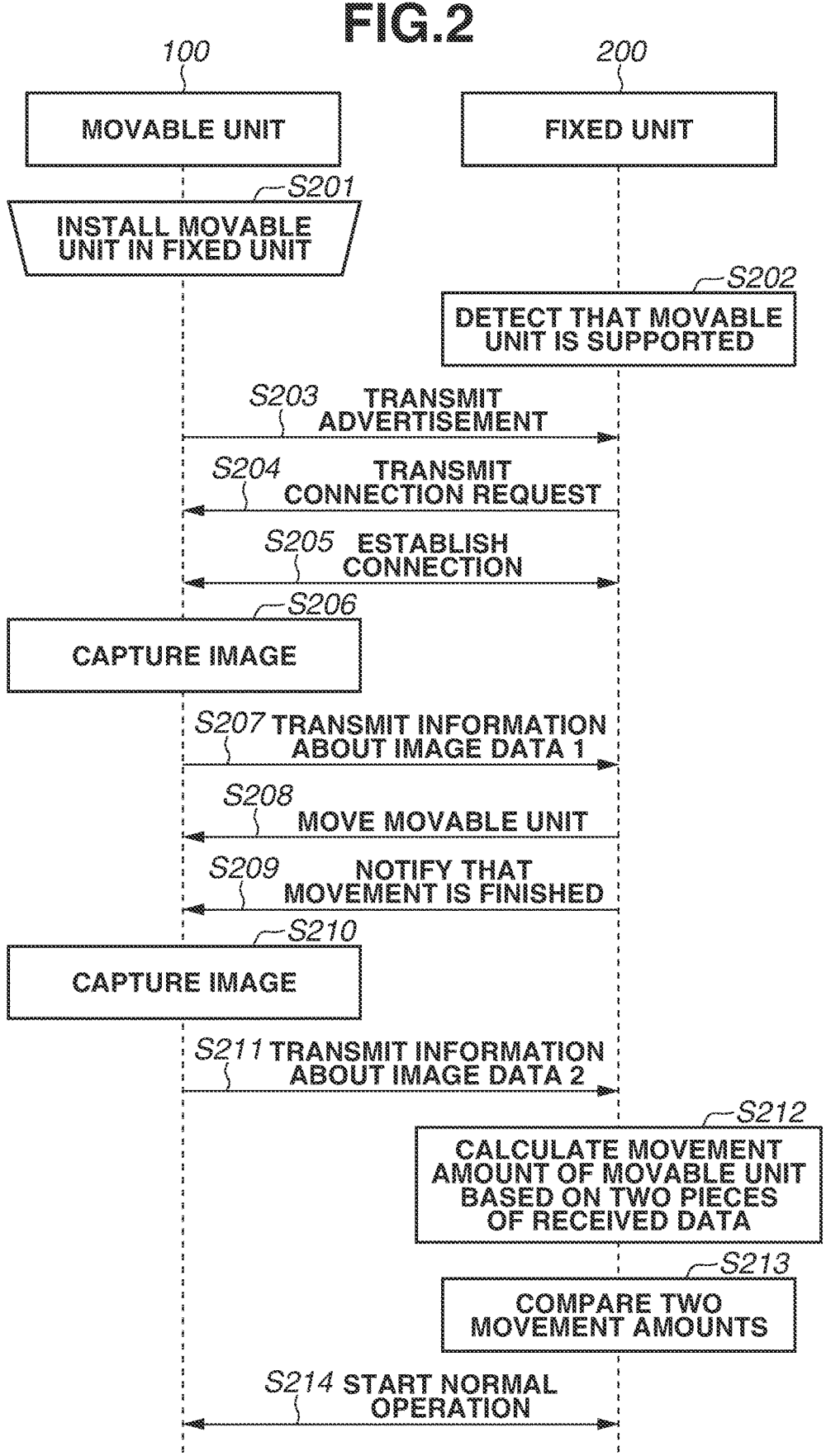
FIG. 2 is a sequence diagram illustrating an example of a procedure for connecting the movable unit and the support member according to the first exemplary embodiment.
Figure 3:
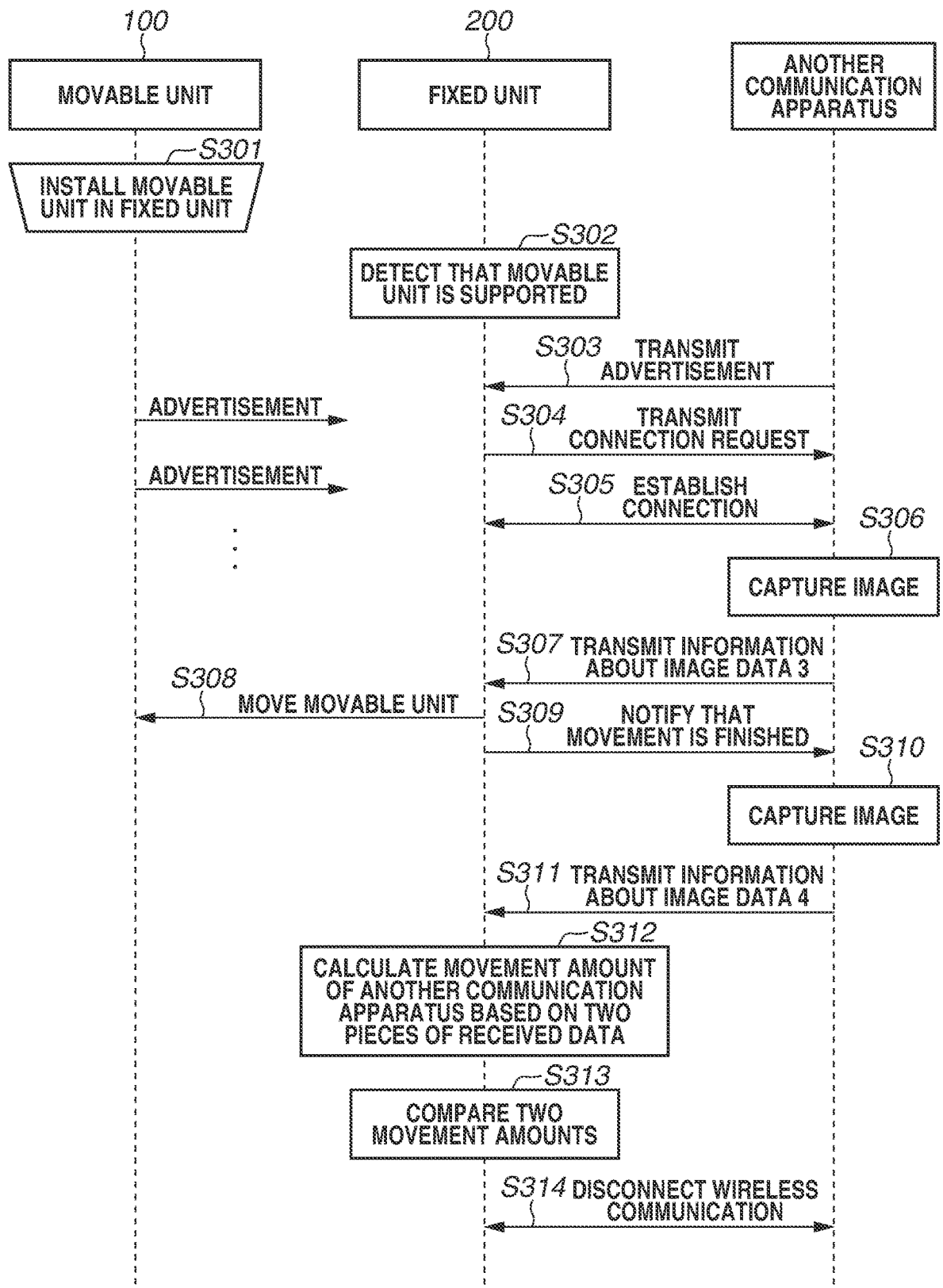
FIG. 3 is a sequence diagram illustrating an example of a procedure for connecting another communication apparatus and the support member according to the first exemplary embodiment.

FIGS. 2 and 3 are sequence diagrams each illustrating example of processing for establishing wireless communication between the movable unit 100 and the support member 200 according to the first exemplary embodiment. A case where erroneous connection to be described below does not occur will be described with reference to FIG. 2, and a case where erroneous connection to be described below occurs will be described with reference to FIG. 3. In an initial state, the movable unit 100 is not supported by the support member 200, and the support member 200 is in a standby state in which the support member 200 is activated but does not perform any operation such as communication. Assume that pairing of the movable unit 100 and the support member 200 based on the communication standard of Bluetooth® Low Energy is completed and the support member 200 is already paired with another communication apparatus which is different from the movable unit 100 and has a structure similar to that of the movable unit 100. The term "pairing" refers to a process in which an apparatus communicating with another apparatus registers (records in a predetermined area) identification information about the other apparatus as identification information about a partner to communicate with and vice versa.

First, an operation to be performed when wireless communication is performed between the movable unit 100 and the support member 200 will be described with reference to the sequence diagram of FIG. 2.

In step S201, a user activates the movable unit 100 and installs the movable unit 100 in the support member 200. The installed movable unit 100 is supported by the support member 200 using the vibrators 11 to 13 and components (not illustrated) for supporting the movable unit 100 so as to prevent the movable unit 100 from being separated from the vibrators 11 to 13.

In step S202, the support member 200 detects that the movable unit 100 is supported. When the support member 200 detects that the movable unit 100 is supported, the support member 200 is ready to receive an advertisement to be described below.

In step S203, the movable unit 100 transmits the advertisement to the support member 200. The term "advertisement" refers to repeatedly transmitting packets to a peripheral area so as to notify other communication apparatuses present in the peripheral area of the presence of the communication apparatus itself. Transmitting, by a communication apparatus, signals to other unspecified communication apparatuses is referred to as broadcasting. In step S203, the advertisement is transmitted to start wireless communication. In the present exemplary embodiment, the movable unit 100 does not include a sensor for detecting that the movable unit 100 is supported by the support member 200. For this reason, the movable unit 100 transmits the advertisement before the movable unit 100 is supported by the support member 200. Even in this case, as described above, the support member 200 is ready to receive the advertisement after detecting that the movable unit 100 is supported. Therefore, the movable unit 100 does not establish a connection for wireless communication to the support member 200 before the movable unit 100 is supported by the support member 200. If the movable unit 100 includes a sensor for detecting that the movable unit 100 is supported by the support member 200, the movable unit 100 transmits the advertisement, upon detection that the movable unit 100 is supported by the support member 200 as a trigger.

In step S204, the support member 200 transmits a connection request packet to the movable unit 100. The connection request packet is transmitted in the form of a response to the reception of the advertisement packet from the movable unit 100.

In step S205, the movable unit 100 establishes a connection for wireless communication to the support member 200 in the form of a response to the connection request packet received in step S204.

The processing for establishing a connection for wireless communication between the movable unit 100 and the support member 200 has been described above. However, not only the movable unit 100 supported by the support member 200, but also another communication apparatus capable of establishing a connection firm wireless communication to the support member 200 may be present in the range in which wireless communication can be established with the support member 200. In this case, the support member 200 may be erroneously connected to the other communication apparatus. Processing in which the support member 200 checks whether a connection for wireless communication to the movable unit 100 is established will be described below. Erroneous connection described herein refers to establishment of a connection for wireless communication between the support member 200 and another communication apparatus that is not supported by the support member 200.

It is desirable for the support member 200 not to move the movable unit 100 between steps S205 and S206. This is because, since the movable unit 100 is not a communication partner when the support member 200 is erroneously connected, there is a possibility that the movable unit 100 cannot be moved to a desirable position even when the movable unit 100 is moved by the support member 200.

In step S206, the movable unit 100 uses the image capturing unit 102 to capture an image for measuring a movement amount. In this case, the image captured in step S206 is referred to as image data 1. To reduce a time required for transmitting data in Bluetooth® Low Energy communication, the movable unit 100 performs processing necessary for transmitting information about the image data 1 in a processing unit (not illustrated) of the image capturing unit 102. As a specific example of the necessary processing, the processing unit of the image capturing unit 102 cuts out a focused portion in the image data 1, or a face and a character detected by using image recognition (hereinafter referred to as a feature portion). Other specific examples of the necessary processing include processing for calculating a position in an image of a feature portion, a distance between a feature portion and a camera, and processing in which the processing unit of the image capturing unit 102 reduces the data capacity by compressing the image data 1.

In step S207, the movable unit 100 transmits the information about the image data 1 to the support member 200. The information about the image data 1 is data processed by the processing unit of the image capturing unit 102 by using the image data 1 in step S206. The information about the image data 1 is received by the support member 200.

In step S208, the support member 200 uses the vibrators 11 to 13 to move the movable unit 100. In this moving operation, the support member 200 moves the movable unit 100 in a predetermined direction by a predetermined distance. The support member 200 may calculate the direction and distance by using a random number, and may use different values every time the movement amount is measured. Thus, even when a plurality of support members is used at a close distance, the possibility of occurrence of erroneous connection can be reduced. In step S208, the support member 200 records the movement amount by which the movable unit 100 has been moved on the recording unit 203.

In step S209, the support member 200 notifies the movable unit 100 that the movement is finished.

In step S210, when the movement by the support member 200 is finished, the movable unit 100 uses the image capturing unit 102 to capture an image for measuring the movement amount. The image captured in step S210 is referred to as image data 2. Also, in step S210, like in step S206, the movable unit 100 uses the processing unit of the image capturing unit 102 to perform processing necessary for measuring the movement amount.

In step S211, the movable unit 100 transmits information about the image data 2 to the support member 200. The information about the image data 2 is data processed by the processing unit of the image capturing unit 102 by using the image data 2 in step S210. The information about the image data 2 is received by the support member 200.

In step S212, the support member 200 calculates the movement amount of the movable unit 100 by using the information about the image data 1 and the information about the image data 2. When the information about the image data 1 and the information about the image data 2 indicate image data obtained by cutting out a feature portion, the support member 200 can calculate the movement amount by using a difference between coordinates indicated by image data obtained before cutting out the feature portion and coordinates indicated by image data obtained after cutting out the feature portion, and a focal length.

In step S213, the support member 200 compares the movement amount of the movable unit 100 obtained by the support member 200 in step S212 with the movement amount by which the movable unit 100 has been moved by the support member 200 in step S208. If the support member 200 determines that the two movement amounts match each other, the processing proceeds to step S214. In step S214, the support member 200 starts a normal operation with the movable unit 100. The state where the two movement amounts match each other indicates a state where a difference between the two movement amounts falls within a predetermined range, and the difference between the two movement amounts need not necessarily be "0". For example, in a case where the movement amount is measured based on a distance and the predetermined range is set to 1 cm, when the difference between the two movement amounts is less than or equal to 1 cm (e.g., 0.6 cm), the support member 200 determines that the two movement amounts match each other. The predetermined range is not limited to an absolute value, such as 1 cm, but instead the ratio of the movement amount, such as 1% of the movement amount, may be set.

An operation to be performed when wireless communication is performed between the support member 200 and another communication apparatus which is different from the movable unit 100 will be described with reference to the sequence diagram of FIG. 3. Assume that another communication apparatus includes at least functions similar to those of the movable unit 100.

Steps S301 and S302 are similar to steps S201 and S202, respectively, which are illustrated in FIG. 2.

In step S303, another communication apparatus transmits an advertisement.

In step S304, the support member 200 transmits a connection request packet to another communication apparatus. The connection request packet is transmitted in the form of a response to the advertisement packet received from the other communication apparatus. Also, in this case, the movable unit 100 transmits the advertisement. However, a case where the support member 200 receives the advertisement first from the other communication apparatus and sends a response to the advertisement will now be described.

In step S305, the other communication apparatus establishes a connection for wireless communication to the support member 200 in the form of a response to the connection request packet received in step S304.

The processing for establishing a connection for wireless communication between the support member 200 and the other communication apparatus has been described above. Processing for determining whether the support member 200 is erroneously connected will be described below.

In step S306, the other communication apparatus captures an image for measuring the movement amount. The image captured in step S306 is referred to as image data 3. To reduce a time required for transmitting data in Bluetooth® Low Energy communication, the other communication apparatus performs processing necessary for transmitting information about the image data 3, like the movable unit 100.

In step S307, the other communication apparatus transmits the information about the image data 3 to the support member 200. The information about the image data 3 is data processed by the other communication apparatus by using the image data 3 in step S306. The information about the image data 3 is received by the support member 200.

In step S308, the support member 200 moves the movable unit 100 by using the vibrators 11 to 13. In step S308, the support member 200 records the movement amount by which the movable unit 100 has been moved on the recording unit 203.

In step S309, the support member 200 notifies the other communication apparatus that movement is finished.

In step S310, the other communication apparatus captures an image for measuring the movement amount. The image captured in step S310 is referred to as image data 4. Also, in step S310, like in step S306, the other communication apparatus performs processing necessary for measuring the movement amount.

In step S311, the other communication apparatus transmits information about the image data 4 to the support member 200. The information about the image data 4 is data processed by the other communication apparatus by using the image data 4 in step S310. The information about the image data 4 is received by the support member 200.

In step S312, the support member 200 calculates the movement amount of the other communication apparatus by using the information about the image data 3 and the information about the image data 4.

In step S313, the support member 200 compares the movement amount of the other communication apparatus obtained by the support member 200 in step S312 with the movement amount by which the movable unit 100 has been moved by the support member 200 in step S308. Since the movable unit 100 is moved and the other communication apparatus is not moved, the support member 200 determines that the two movement amounts do not match each other.

In step S314, the support member 200 disconnects the wireless connection with the other communication apparatus and starts processing for establishing a connection to the movable unit 100. The processing in which the support member 200 establishes a connection to the movable unit 100 will be described below.

A method for establishing a connection for wireless communication between the movable unit 100 and the support member 200 and a method for detecting whether the movable unit 100 is supported by the support member 200 have been described above with reference to FIGS. 2 and 3. Consequently, it is possible to more reliably detect a mobile body supported by the support member 200 even when, for example, the user replaces one mobile body with another among a plurality of mobile bodies so as to attach the mobile body to the support member 200 for use.

In this case, in step S304, the support member 200 sends a response to the first received advertisement, but instead may send a response to an advertisement with a highest reception intensity, or an advertisement with a minimum attenuation of a reception intensity. The use of the magnitude, attenuation, or the like of the reception intensity enables the support member 200 to determine the distance from the apparatus that has transmitted the advertisement. Since it is generally considered that the communication apparatus supported by the support member 200 is located closest to the support member 200, the support member 200 can determine that it is highly likely that the communication apparatus located closest to the support member 200 is the movable unit 100 supported by the support member 200. In addition, the central control unit 201 may select a mobile body to be connected by applying any conditions.

<Operation of Movable Unit 100>

Figure 4:
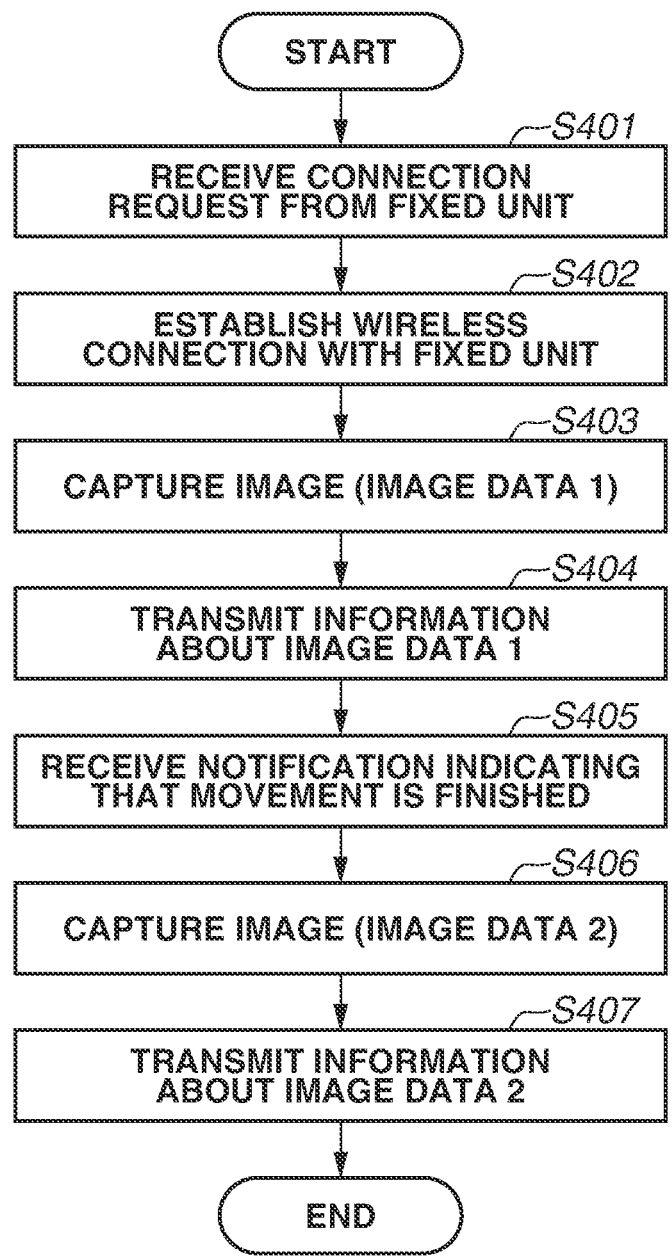
FIG. 4 is a flowchart illustrating an example of an operation of the movable unit according to the first exemplary embodiment.

FIG. 4 is a flowchart illustrating an example of an operation of the movable unit 100 according to the first exemplary embodiment. A control operation in each step illustrated in FIG. 4 is executed by the control unit 107 that controls each unit of the movable unit 100. The movable unit 100 transmits the advertisement before the movable unit 100 is supported by the support member 200, as described above in step S203. Accordingly, the movable unit 100 starts the processing illustrated in FIG. 4 upon reception of the connection request packet from the support member 200 as a trigger.

In step S401, the contrail unit 107 uses the movable unit wireless communication unit 104 to receive the connection request packet from the support member 200. In a case where the control unit 107 receives the connection request packet, the control unit 107 performs processing of step S402. Step S401 corresponds to step S204 illustrated in FIG. 2.

In step S402, the control unit 107 uses the movable unit wireless communication unit 104 to establish a connection for wireless communication to the support member 200. Step S402 corresponds to step S205 illustrated in FIG. 2.

In step S403, the control unit 107 captures an image for measuring the movement amount by using the lens 101 and the image capturing unit 102. The captured image is processed by an image processing unit (not illustrated) of the image capturing unit 102. The processed image data is referred to as the image data 1. Step S403 corresponds to step S206 illustrated in FIG. 2.

In step S404, the control unit 107 uses the movable unit wireless communication unit 104 to transmit the information about the image data 1 to the support member 200. Step S404 corresponds to step S207 illustrated in FIG. 2.

In step S405, the control unit 107 uses the movable unit wireless communication unit 104 to receive, from the support member, a notification indicating that movement is finished. Step S405 corresponds to step S209 illustrated in FIG. 2.

In step S406, the control unit 107 captures an image for measuring, the movement amount by using the lens 101 and the image capturing unit 102. The captured image is processed by the processing unit (not illustrated) of the image capturing unit 102. The processed image data is referred to as the image data 2. Step S406 corresponds to step S210 illustrated in FIG. 2.

In step S407, the control unit 107 uses the movable unit wireless communication unit 104 to transmit the information about the image data 2 to the support member 200. Step S407 corresponds to step S211 illustrated in FIG. 2.

An example of the operation of the movable unit 100 has been described above.

In step S405, the control unit 107 receives the notification from the support member 200 to thereby determine whether the movement is finished, but instead may use a movement detection unit (not illustrated), such as an acceleration sensor or a gyroscope sensor, to thereby determine that the movement is finished.

<Operation of Support Member 200>

Figure 5:
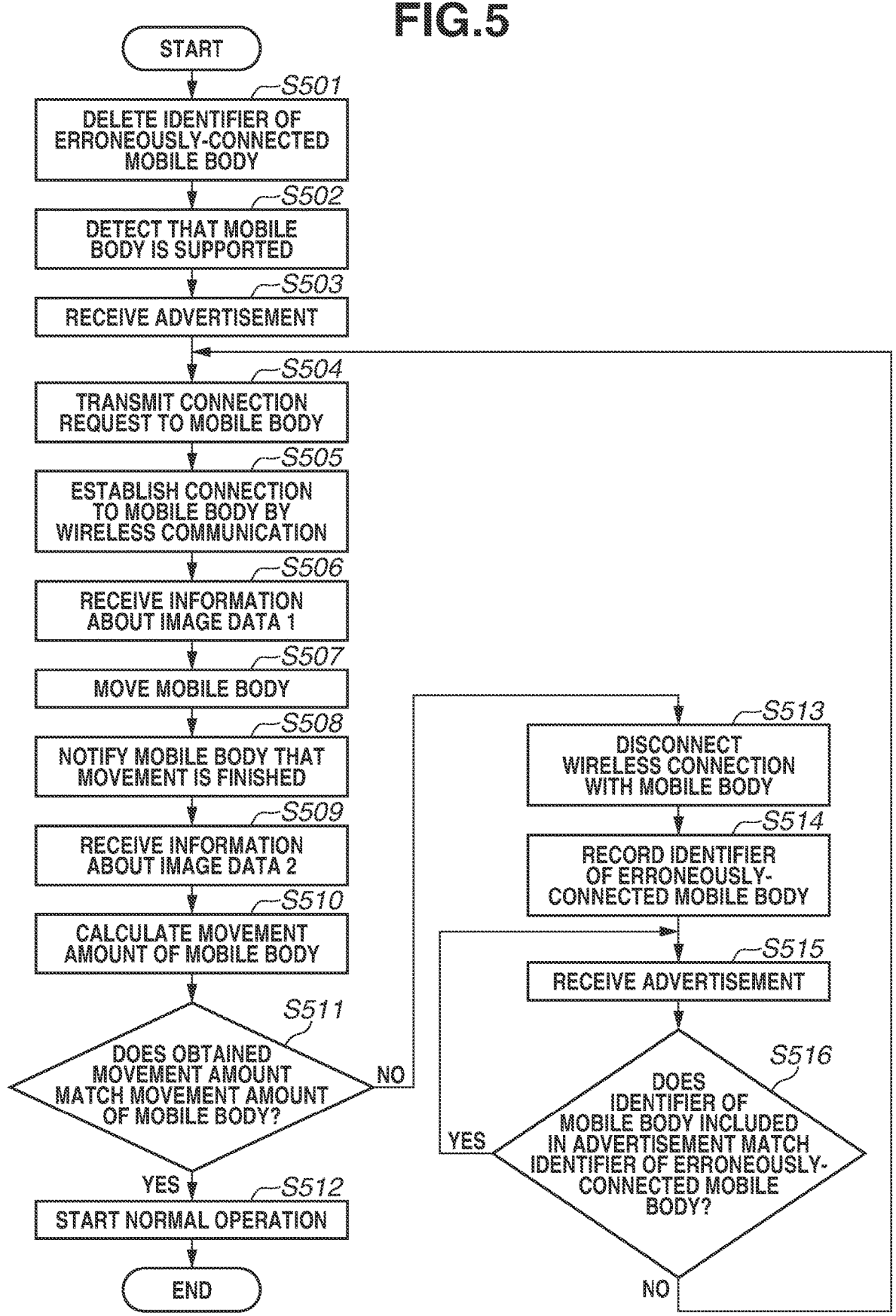
FIG. 5 is a flowchart illustrating an example of an operation of the support member according to the first exemplary embodiment.

FIG. 5 is a flowchart illustrating an example of an operation of the support member 200 according to the first exemplary embodiment. A control operation in each step illustrated in FIG. 5 is executed by the central control unit 201 that controls each unit of the support member 200. As described above, in the initial state, the movable unit 100 is not supported by the support member 200, and the support member 200 is in the standby state in which the support member 200 is activated but does not perform any operation such as communication. For example, the support member 200 does not transmit the connection request packet even when the support member 200 receives an advertisement or the like.

In the present exemplary embodiment, the movable unit 100 is replaceable, and the user can use the support member 200 by replacing the movable unit 100 with another communication apparatus. Assume herein that the other communication apparatus includes at least functions similar to those of the movable unit 100. In the description of this flowchart, the movable unit 100 illustrated in FIG. 2 and the other communication apparatus are collectively referred to as a mobile body, for convenience of explanation.

In step S501, the central control unit 201 deletes an identifier of an erroneously-connected mobile body which is recorded on the recording unit 203. This processing is performed when the user activates the support member 200, or when the mobile body is detached from the support member 200. Processing in which the support member 200 records the identifier of the erroneously-connected mobile body will be described below. This step is carried out before step S202 illustrated in FIG. 2. However, in the processing of step S502, the processing of step S301 may be carried out, with such an event that the central control unit 201 has detected that the mobile body is supported by using the support detection unit 211 as a trigger. The processing of step S501 may be carried out when the normal operation in step S512 to be described below is started.

In step S502, the central control unit 201 uses the support detection unit 211 to detect that the mobile body is supported by the support member 200. Upon detecting that the mobile body is supported, the central control unit 201 releases the standby state and performs processing of step S503. Step S502 corresponds to step S202 illustrated in FIG. 2.

In step S503, the central control unit 201 uses the support member wireless communication unit 208 to receive the advertisement for starting wireless communication. Upon receiving the advertisement, the central control unit 201 performs processing of step S504. Step S503 corresponds to step S203 illustrated in FIG. 2 and step S303 illustrated in FIG. 3.

In step S504, the central control unit 201 uses the support member wireless communication unit 208 to transmit a connection request to the mobile body which has transmitted the received advertisement. In a case where the central control unit 201 receives advertisements from a plurality of mobile bodies, the central control unit 201 transmits the connection request so as to respond to the advertisement received first. Step S504 corresponds to step S204 illustrated in FIG. 2 and step S304 illustrated in FIG. 3.

In step S505, the central control unit 201 uses the support member wireless communication unit 208 to establish a connection for wireless communication to the mobile body, which is the communication partner that has transmitted the connection request in step S504. Step S505 corresponds to step S205 illustrated in FIG. 2 and step S305 illustrated in FIG. 3. At this point of time, the central control unit 201 has recognized yet whether the mobile body supported by the support member 200 is the same as the mobile body connected by wireless communication.

In step S506, the central control unit 201 receives information about the image data 1 (or image data 3) from the mobile body connected using the support member wireless communication unit 208. Upon receiving the information about the image data 1, the central control unit 201 performs processing of step S507. The central control unit 201 records the information about the image data 1 on the recording unit 203. Step S506 corresponds to step S207 illustrated in FIG. 2 and step S307 illustrated in FIG. 3.

In step S507, the central control unit 201 uses the vibrators 11 to 13 to move the mobile body, which is supported by the support member 200, by a predetermined movement amount. The predetermined movement amount is the same as the movement amount described above in step S208 illustrated in FIG. 2. Step S507 corresponds to step S208 illustrated in FIG. 2 and step S308 illustrated in FIG. 3.

In step S508, the central control unit 201 uses the support member wireless communication unit 208 to notify the mobile body that movement is finished. Step S508 corresponds to step S209 illustrated in FIG. 2 and step S309 illustrated in FIG. 3.

In step S509, the central control unit 201 uses the support member wireless communication unit 208 to receive the information about the image data 2 (or image data 4) from the mobile body. Upon receiving the information about the image data 2, the central control unit 201 performs processing of step S510. The central control unit 201 records the information about the image data 2 on the recording unit 203. Step S509 corresponds to step S211 illustrated in FIG. 2 and step S311 illustrated in FIG. 3.

In step S510, the central control unit 201 calculates the movement amount of the mobile body connected by wireless communication by using the information about the image data 1 and the information about the image data 2 which are received from the mobile body Step S510 corresponds to step S212 illustrated in FIG. 2 and step S312 illustrated in step S312.

In step S511, the central control unit 201 determines whether the movement amount obtained in step S510 matches the movement amount by which the mobile body has been moved in step S507. Step S511 corresponds to step S213 illustrated in FIG. 2 and step S313 illustrated in FIG. 3. If the two movement amounts match each other (YES in step S511), the central control unit 201 performs processing of step S512. If the two movement amounts do not match each other (NO in step S511), the central control unit 201 performs processing of step S513. As described above, the state where the two movement amounts match each other indicates a state where the difference between the two movement amounts falls within the predetermined range.

In step S512, the central control unit 201 determines that the connected mobile body is identical to the mobile body supported by the support member 200, and starts the normal operation. The normal operation according to the present exemplary embodiment is an operation in which the central control unit 201 controls each unit of the movable unit 100 and the support member 200 to perform image capturing and the like. Step S512 corresponds to step S214 illustrated in FIG. 2.

In step S513, the central control unit 201 determines that erroneous connection has occurred, i.e., determines that the mobile body connected by wireless communication is different from the mobile body supported by the support member 200, and performs processing for disconnecting the connection. Step S513 corresponds to step S314 illustrated in FIG. 3. After this processing, the central control unit 201 performs processing for establishing a connection for wireless communication to the movable unit 100 as described below.

An example of processing to be performed by the central control unit 201 when the support member 200 is erroneously connected will be described below.

In step S514, the central control unit 201 records the identifier of the erroneously-connected mobile body on the recording unit 203. This is because, in a case where wireless communication is to be performed with a mobile body, the central control unit 201 is prevented from establishing a connection for wireless communication to the erroneously-connected mobile body again.

In step S515, the central control unit 201 uses the support member wireless communication unit 208 to receive the advertisement for starting wireless communication.

In step S516, the central control unit 201 checks whether the identifier recorded in step S514 matches the identifier of the mobile body included in the advertisement. If the two identifiers do not match each other (NO in step S516), the central control unit 201 performs the processing of step S504 again. If the two identifiers match each other (YES in step S516), the central control unit 201 performs the processing of step S515 and repeats the processing until an advertisement is received from another mobile body.

By the series of processing as described above, when the support member 200 is erroneously connected, the support member 200 can disconnect the wireless communication from the erroneously-connected mobile body. The support member 200 can establish a connection for wireless communication to the movable unit 100, without establishing a connection for wireless communication to the erroneously-connected mobile body again.

An example of the operation of the support member 200 has been described above.

In this case, in step S504, the central control unit 201 may transmit the connection request so as to respond to an advertisement with a highest reception intensity. This is because the central control unit 201 can determine the distance from the mobile body by using the reception intensity of the advertisement. In addition, the central control unit 201 may select a mobile body to be connected by applying any conditions.

Figure 6:
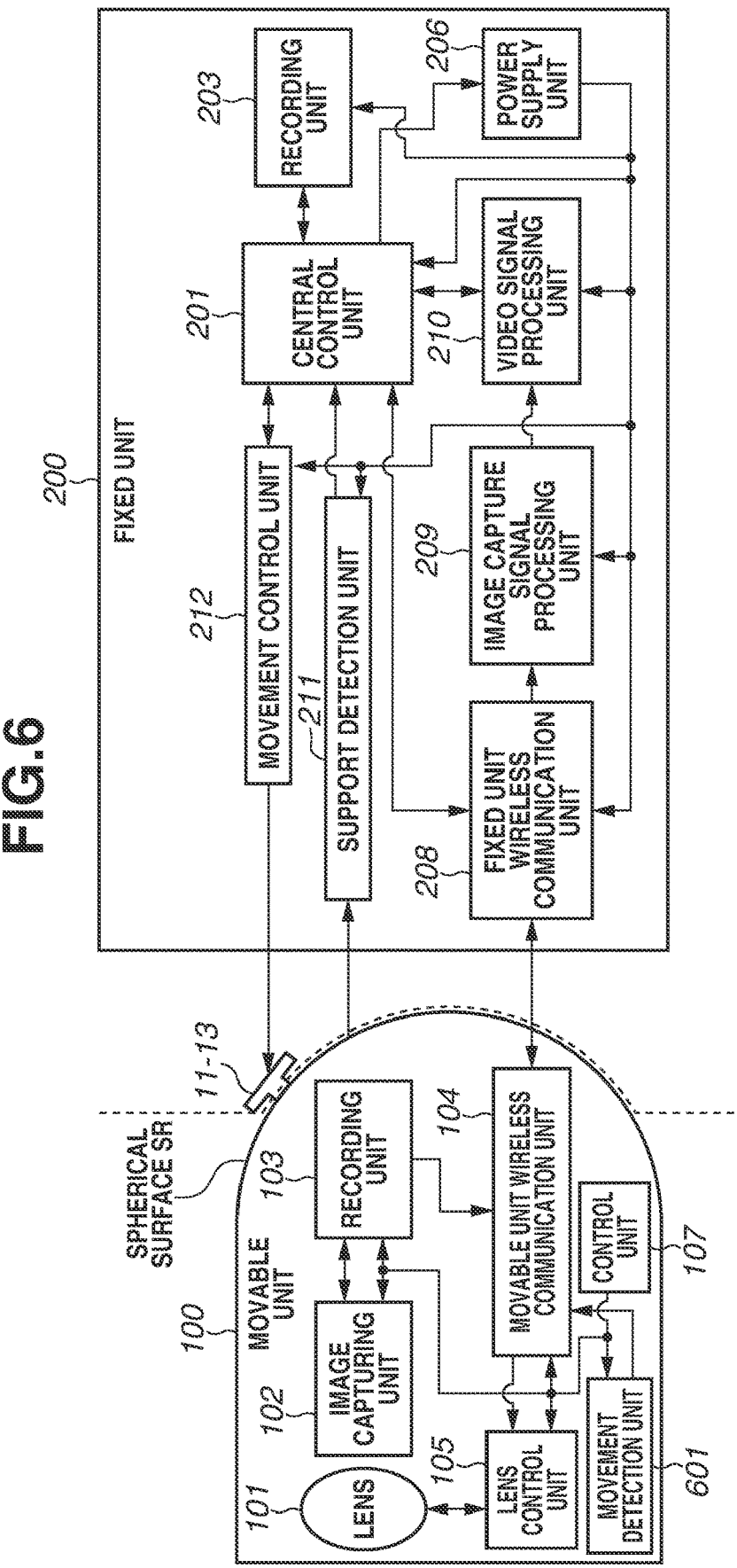
FIG. 6 is a block diagram illustrating an example of an electronic apparatus including a movable unit and a support member according to a second exemplary embodiment.

FIG. 6 is a block diagram illustrating an example of an apparatus including a movable unit and a support member according to a second exemplary embodiment. In the apparatus illustrated in FIG. 6, the movable unit is an example of the communication apparatus and the support member is an example of the electronic apparatus. In FIG. 6, components similar to those illustrated in FIG. 1 are denoted by the same reference numerals, and descriptions thereof are herein omitted.

A movement detection unit 601 is a unit that detects movement, of the support member 200. For example, a gyroscope sensor or an acceleration sensor is used as the movement detection unit 601.

Figure 7:
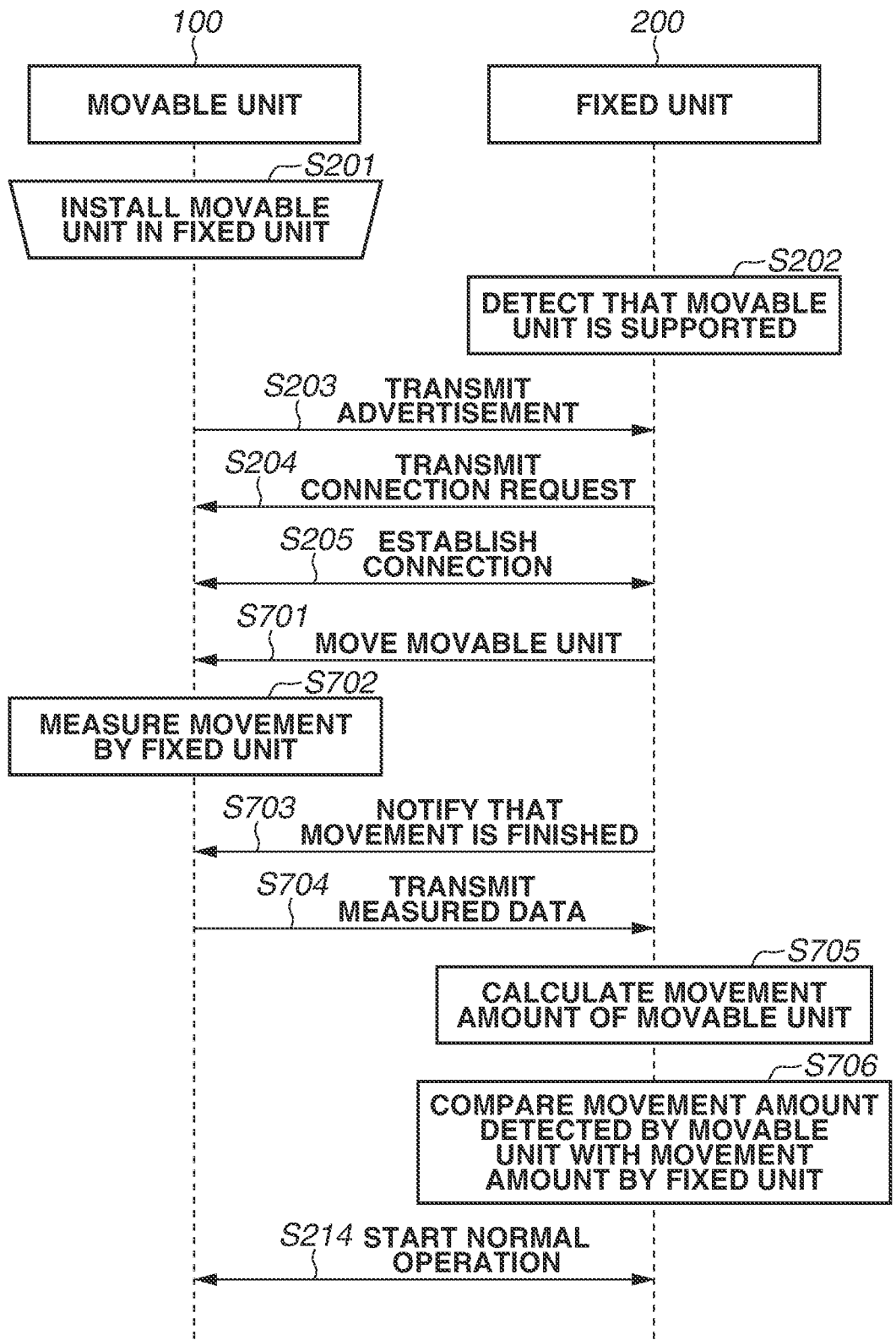
FIG. 7 is a sequence diagram illustrating an example of a procedure for connecting the movable unit and the support member according to the second exemplary embodiment.

FIG. 7 is a sequence diagram illustrating an example of processing for establishing wireless communication between the movable unit and the support member according to the second exemplary embodiment. A case where erroneous connection to be described below does not occur will be described with reference to FIG. 7, and a case where erroneous connection to be described below occurs will be described with reference to FIG. 8. In the initial state, the movable unit 100 is not supported by the support member 200, and the support member 200 is in the standby state in which the support member 200 is activated but does not perform any operation such as communication. Assume that pairing of the movable unit 100 and the support member 200 based on the communication standard of Bluetooth® Low Energy is completed and the support member 200 is already paired with a communication apparatus other than the movable unit 100. Steps similar to those illustrated in FIG. 2 are denoted by the same reference symbols, and descriptions thereof are omitted.

An operation to be performed when wireless communication is performed between the movable unit 100 and the support member 200 will be described with reference to the sequence diagram of FIG. 7.

Processing, from step S201 to step S205 is similar to the processing illustrated in FIG. 2.

In step S701, the support member 200 moves the movable unit 100. In this moving, operation, the support member 200 causes the movable unit 100 to move in a predetermined direction by a predetermined distance. The support member 200 may calculate the direction and distance by using a random number, and may use different values every time the movement amount is measured. As a result, even when a plurality of support members is used at a close distance, the possibility of occurrence of erroneous connection can be reduced. In step S701, the support member 200 records the movement amount by which the movable unit 100 has been moved on the recording unit 203.

In step S702, the movable unit 100 measures movement by the movable unit 100. In the measurement in step S702, the movable unit 100 records an acceleration, an angular velocity, and the like by using the movement detection unit 601. The movable unit 100 continues the measurement until a notification indicating that the movement is finished is received from the support member 200 in step S703.

In step S703, the support member 200 notifies the movable unit 100 that the movement is finished. The movable unit 100 which has received this notification determines that the movement of the support member 200 is finished, and then finishes the measurement of the movement.

In step S704, the movable unit 100 transmits the data obtained in the measurement in step S702 to the support member 200.

In step S705, the support member 200 calculates the movement amount of the movable unit 100 by using the data which is received in step S704 and is obtained through the measurement by the movable unit 100.

In step S706, the support member 200 compares the movement amount by which the movable unit 100 has been moved in step S701 with the movement amount calculated in step S705. If the two movement amounts match each other, the normal operation is started. The state where the two movement amounts match each other indicates a state where the difference between the two movement amounts falls within the predetermined range, and the difference between the two movement amounts need not be "0". For example, in a case where the movement amount is measured based on a distance and the predetermined range is set to 1 cm, when the difference between the two movement amounts is less than or equal to 1 cm (e.g., 0.6 cm), the support member 200 determines that the two movement amounts match each other. The predetermined range is not limited to an absolute value, such as 1 cm, but instead the ratio of the movement amount, such as 1% of the movement amount, may be set.

Step S214 is similar to that illustrated in FIG. 2, and thus the description thereof is omitted.

Figure 8:
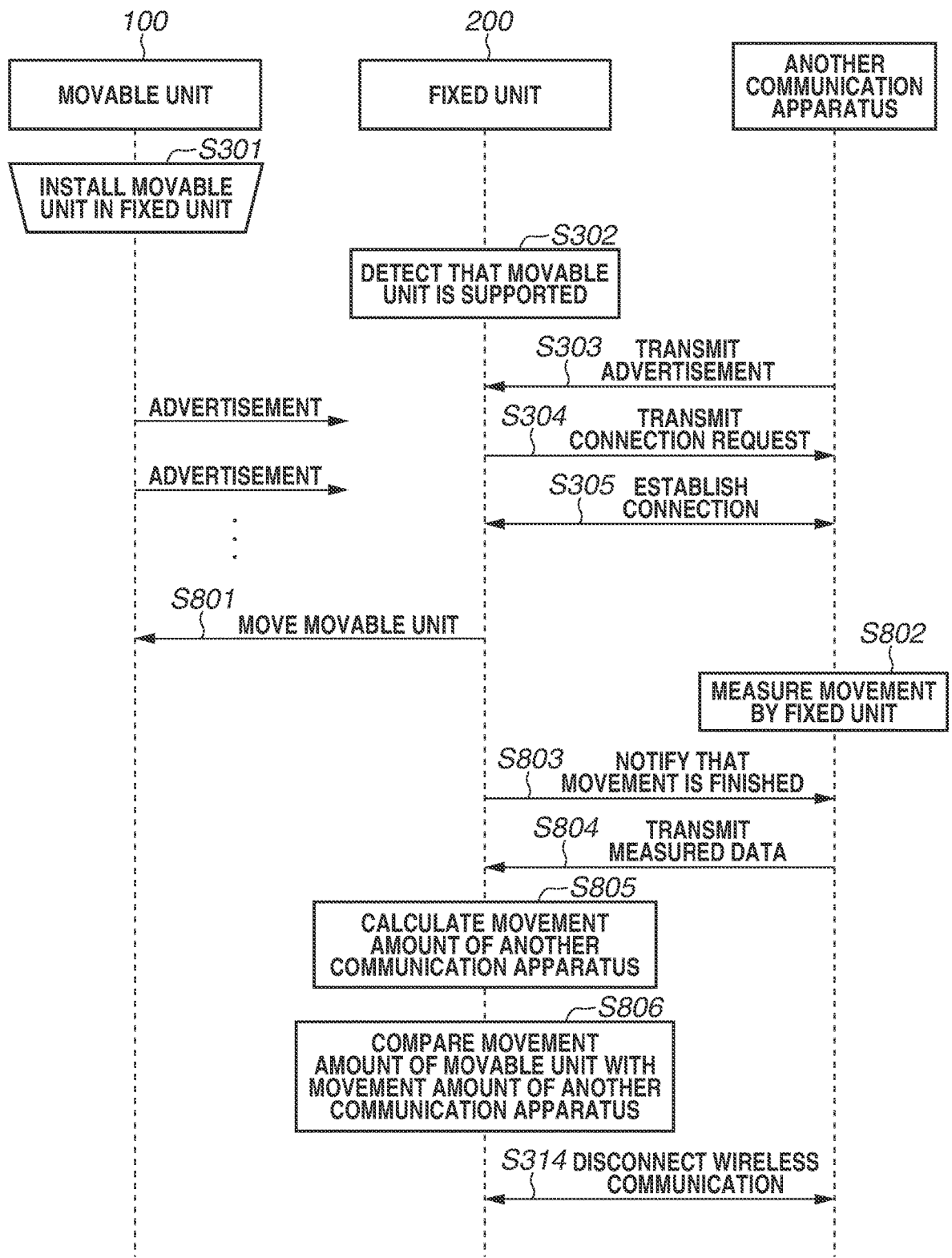
FIG. 8 is a sequence diagram illustrating an example of a procedure for connecting another communication apparatus and the support member according to the second exemplary embodiment.

An operation to be performed when wireless communication is established between the support member 200 and another communication apparatus which is different from the movable unit 100 will be described with reference to the sequence diagram of FIG. 8. Assume that the other communication apparatus includes at least functions similar to those of the movable unit 100.

Processing from step S301 to step S305 is similar to the processing illustrated in FIG. 3.

Processing of step S801 is similar to processing of step S701 illustrated in FIG. 7.

In step S802, the other communication apparatus measures movement by itself. In the measurement of step S802, the other communication apparatus records an acceleration, an angular velocity, like in the measurement by the movable unit 100 in step S702. In step S803, the other communication apparatus continues the measurement until a notification indicating that movement is finished is received from the support member 200.

In step S803, the support member 200 notifies the other communication apparatus that movement is finished. The other communication apparatus that has received this notification determines that movement of the support member 200 is finished, and then completes the measurement of movement.

In step S804, the other communication apparatus transmits the data obtained by the measurement in step S802 to the support member 200.

In step S805, the support member 200 calculates the movement amount of the other communication apparatus by using the data which is received in step S804 and is obtained through the measurement by the other communication apparatus.

In step S806, the support member 200 compares the movement amount by which another communication apparatus has been moved in step S801 with the movement amount calculated in step S805. Since the movable unit 100 is moved and the other communication apparatus is not moved, the support member 200 determines that the two movement amounts do not match each other.

Step S314 is similar to that illustrated in FIG. 3, and thus the description thereof is omitted.

A method for establishing a connection for wireless communication between the movable unit 100 and the support member 200 and a method for detecting whether the movable unit 100 is supported by the support member 200 have been described above with reference to FIGS. 7 and 8.

Figure 9:
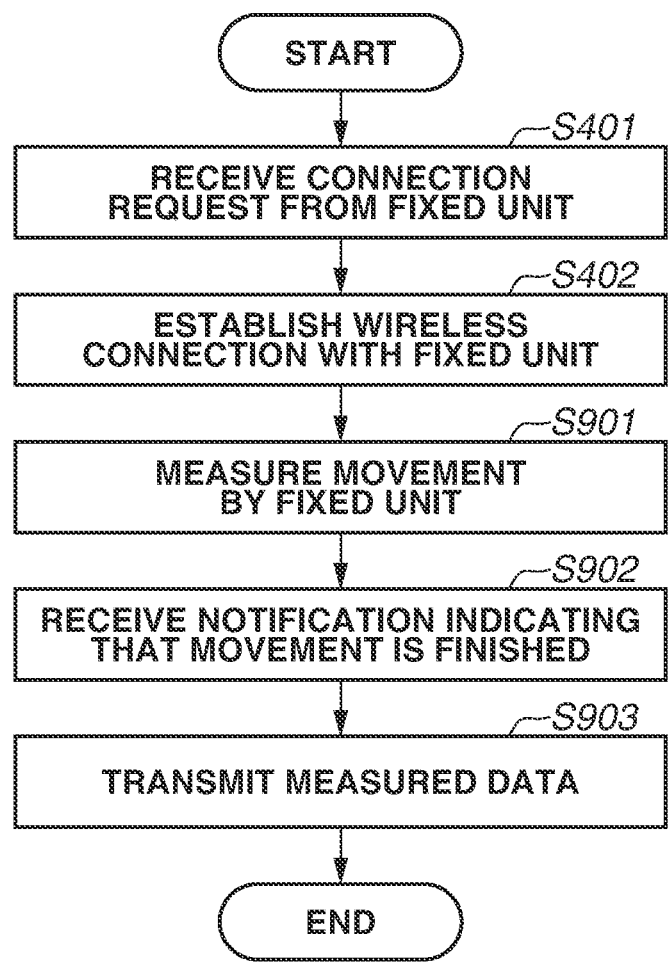
FIG. 9 is a flowchart illustrating an example of an operation of the movable unit according to the second exemplary embodiment.

FIG. 9 is a flowchart illustrating an example of processing to be performed by the control unit 107 of the movable unit 100 according to the second exemplary embodiment. A control operation in each step illustrated in FIG. 9 is executed by the control unit 107 that controls each unit of the movable unit 100. The movable unit 100 transmits an advertisement before the movable unit 100 is supported by the support member 200, as described above in step S203. Accordingly, as illustrated in FIG. 9, the processing is started, upon reception of the connection request packet from the support member 200 as a trigger. Steps similar to those illustrated in FIG. 4 are denoted by the same reference symbols, and descriptions thereof are omitted.

The processing of steps S401 and S402 is similar to the processing illustrated in FIG. 4.

In step S901, the control unit 107 uses the movement detection unit 601 to measure movement. The control unit 107 records the measured acceleration, angular velocity, on the recording unit 103. Step S901 corresponds to step S702 illustrated in FIG. 7.

In step S902, the control unit 107 determines whether movement by the support member 200 is finished. The control unit 107 uses the movable unit wireless communication unit 104 to receive a notification indicating that movement is finished from the support member 200, thereby determining that the movement by the support member 200 is finished, and then completes the measurement. If the measured movement amount is less than or equal to a predetermined value for a predetermined period or longer, the control unit 107 may determine that the movement is finished. Any value may be set as the predetermined period and the predetermined value. When the control unit 107 determines that the movement of the movable unit 100 is finished, the control unit 107 performs processing of step S903. Step S902 corresponds to step S703 illustrated in FIG. 7.

In step S903, the control unit 107 uses the movable unit wireless communication unit 104 to transmit the data obtained by the measurement in step S901 to the support member 200. The data obtained by the measurement is recorded on the recording unit 103. Step S903 corresponds to step S704 illustrated in FIG. 7.

Figure 10:
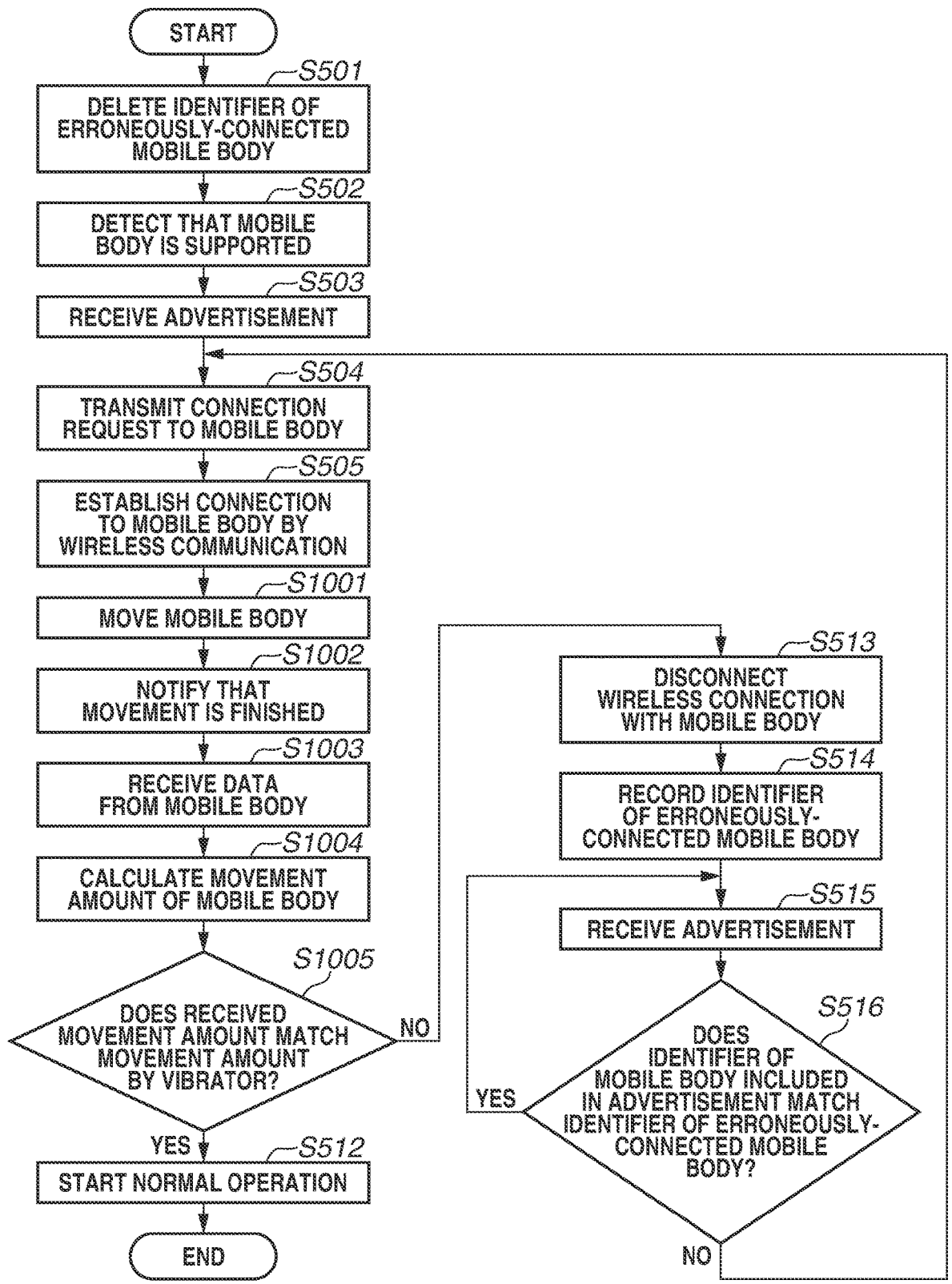
FIG. 10 is a flowchart illustrating an example of an operation of the support member according to the second exemplary embodiment.

FIG. 10 is a flowchart illustrating an example of processing to be performed by the central control unit 201 of the support member 200 according to the second exemplary embodiment. A control operation in each step illustrated in FIG. 10 is executed by the central control unit 201 that controls each unit of the support member 200. In the initial state, the movable unit 100 is not supported by the support member 200 and the support member 200 is in the standby state in which the support member 200 is activated but does not perform any operation such as communication. For example, the support member 200 does not transmit the connection request packet even when the support member 200 receives an advertisement or the like.

In the present exemplary embodiment, the movable unit 100 is replaceable, and the user can use the support member 200 by replacing the movable unit 100 with another communication apparatus. Assume herein that the other communication apparatus includes at least functions similar to those of the movable unit 100. In the description of this flowchart, the movable unit 100 illustrated in FIGS. 7 and 8 and the other communication apparatus are collectively referred to as a mobile body, for convenience of explanation.

Processing from step S501 to step S505 is similar to the processing illustrated in FIG. 5.

In step S1001, the central control unit 201 uses the vibrators 11 to 13 to move the mobile body, which is supported by the support member 200, by a predetermined movement amount. Step S1001 corresponds to step S701 illustrated in FIG. 7.

In step S1002, the central control unit 201 uses the support member wireless communication unit 208 to notify the mobile body to which a connection for wireless communication has been established that movement is finished. Step S1002 corresponds to step S703 illustrated in FIG. 7 and step S803 illustrated in FIG. 8.

In step S1003, the central control unit 201 uses the support member wireless communication unit 208 to receive the data obtained by the measurement by the mobile body to which a connection for wireless communication has been established. Step S1003 corresponds to step S704 illustrated in FIG. 7 and step S804 illustrated in FIG. 8.

In step S1004, the central control unit 201 calculates the movement amount by using the data obtained by the measurement by the mobile body to which a connection for wireless communication has been established. Step S1004 corresponds to step S705 illustrated in FIG. 7 and step S805 illustrated in FIG. 8.

In step S1005, the central control unit 201 compares the movement amount by which the mobile body supported by the support member 200 has been moved in step S1001 with the movement amount, which is calculated in step S1004, of the mobile body to which a connection for wireless communication has been established, and determines whether the two movement amounts match each other. If the two movement amounts match each other (YES in step S1005), the central control unit 201 performs the processing of step S512. If the two movement amounts do not match each other (NO in step S1005), the central control unit 201 performs the processing of step S513. As described above, the state where the two movement amounts match each other indicates a state where the difference between the two movement amounts falls within the predetermined range. Step S1005 corresponds to step S706 illustrated in FIG. 7.

Processing of steps S512 and S513 and subsequent steps after step S1005 are similar to the processing illustrated in FIG. 5.

Figure 11:
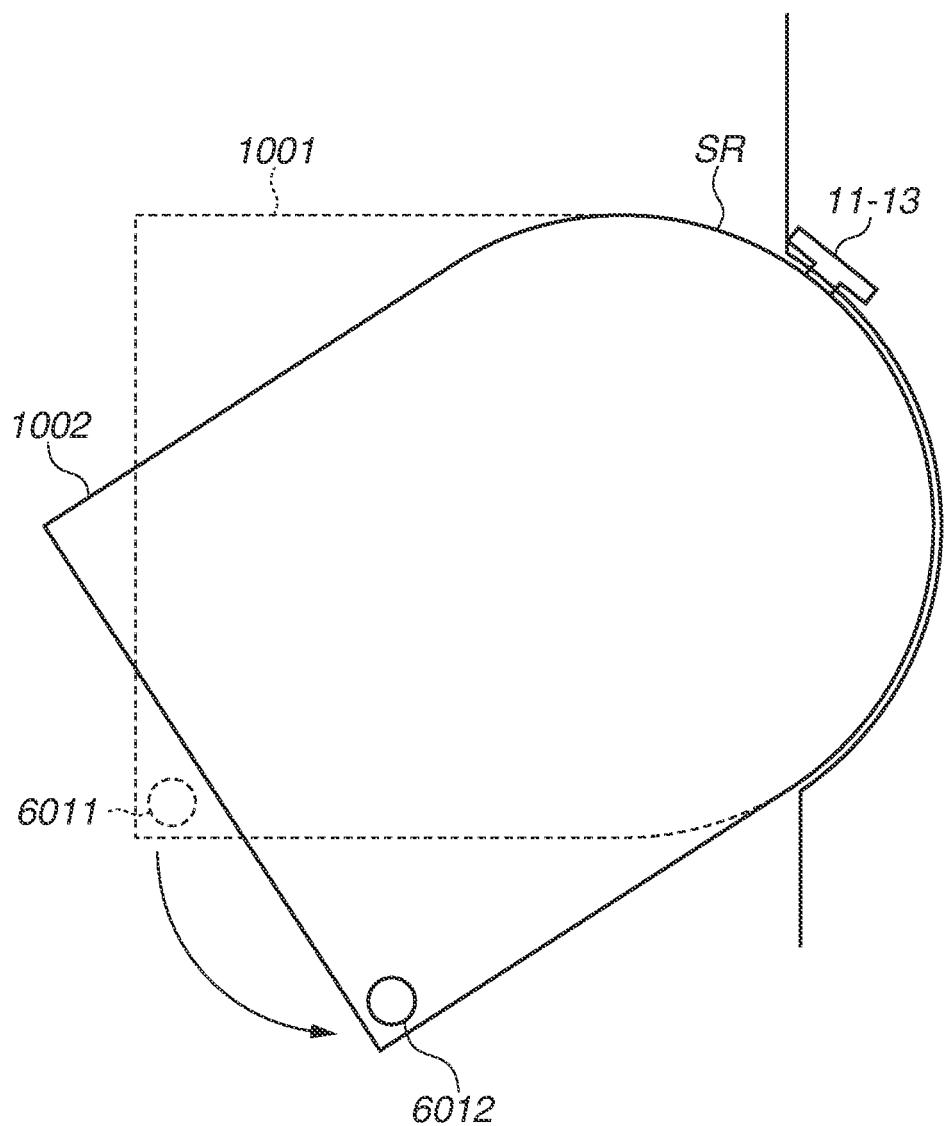
FIG. 11 illustrates an example of a method of measuring movement of the movable unit.

An example of a specific method for detecting a movement amount using an acceleration sensor will be described with reference to FIG. 11. In FIG. 11, components similar to those illustrated in FIG. 6 are denoted by the same reference numerals.

A movable unit 1001 indicated by a broken line corresponds to the movable unit 100 and has not been moved yet by the vibrators 11 to 13.

A movement detection unit 6011 indicated by a broken line corresponds to the movement detection unit 601 and has not been moved yet by the vibrators 11 to 13.

A movable unit 1002 indicated by a solid line corresponds to the movable unit 100 and has been rotated by the vibrators 11 to 13.

A movement detection unit 6012 indicated by a solid line corresponds to the movement detection unit 601 and has been rotated by the vibrators 11 to 13.

The support member 200 (not illustrated) uses the vibrators 11 to 13 to move the movable unit 100 from the position of the movable unit 1001 to the position of the movable unit 1002. In this case, the position of the movement detection unit is moved from the position of the movement detection unit 6011 to the position of the movement detection unit 6012. Accordingly, the movement detection unit detects the acceleration or angular velocity of the movement. As a result, the movable unit 100 can detect that the movable unit 100 is moved by the vibrators 11 to 13.

Although the present exemplary embodiment illustrates an example in which the movable unit 100 is moved on a two-dimensional plane, the movement amount by which the movable unit 100 is moved in a three-dimensional space can also be detected by arranging a plurality of movement detection units 601 so that the movement amount can be detected in a three-dimensional space.

As a method for detecting whether the movable unit 100 is supported by the support member 200, a method in which the support member 200 causes the movable unit 100 to vibrate can be used. For example, the vibrators 11 to 13 cause the movable unit 100 to vibrate and the vibrations are detected by the movement detection unit 601.

In the case of detecting the vibrations, for example, it is necessary to reduce noise caused by various factors such as a vibration due to disturbance. Accordingly, for example, in a case where the vibrators 11 to 13 cause the movable unit 100 to vibrate using a predetermined vibration pattern, a band-pass filter (not illustrated) and a threshold for an amplitude amount are set for a result of detection by the movement detection unit 601. Thus, the central control unit 201 can determine whether the support member 200 has caused the movable unit 100 to vibrate, while suppressing a deterioration in detection accuracy.

Figure 12:
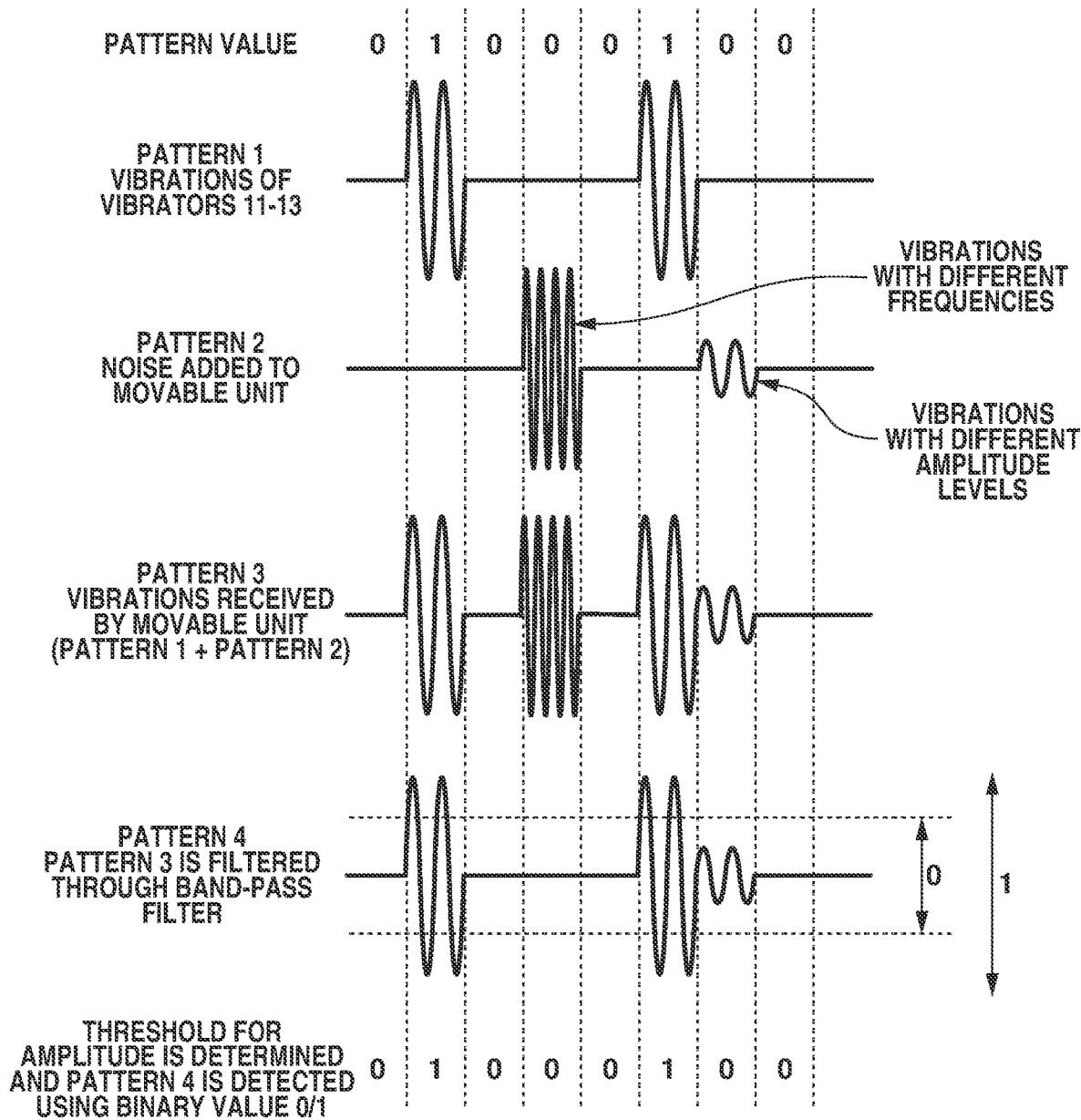
FIG. 12 illustrates an example of a method by which the support member uses vibrations to detect that the movable unit is supported.

An example of a specific method will be described with reference to FIG. 12. In FIG. 12, a vertical axis represents an amplitude and a horizontal axis represents time.

Assume that, as indicated by a pattern 1, the vibrators (vibration wave motors) 11 to 13 apply vibrations to the movable unit 100 by using a vibration pattern with a pattern value 01000100.

As indicated by a pattern 2, noise in vibrations with different frequencies or vibrations with different amplitude amounts is added to the movable unit 100. The noise is caused, for example, when the user shakes or taps the electronic apparatus, or when a unit group of the lens 101 is operated.

As a result of adding the vibrations of the pattern 1 and the pattern 2 to the movable unit 100, the movement detection unit 601 of the movable unit 100 detects vibrations of a pattern 3.

On the other hand, a noise reduction circuit (not illustrated) performs noise reduction processing on a detected waveform, and the central control unit 201 determines the vibration pattern. The noise reduction circuit is a circuit for eliminating noise included in the vibration pattern. Specific examples of the noise reduction circuit include a band-pass filter. This noise reduction circuit may be included in at least one of the movable unit 100 and the support member 200.

The noise reduction circuit eliminates noise as indicated by a pattern 4 by, for example, by filtering signals other than a signal of a specific frequency through a band-pass filter for attenuating the signals.

Further, in a case where a predetermined threshold is set for the amplitude amount, the central control unit 201 detects the vibration pattern of the pattern 4 using binary values of "0" and "1".

By the method as described above, the central control unit 201 detects the vibration pattern which is applied to the movable unit 100 by the vibrators 11 to 13.

The central control unit 201 compares the vibration pattern detected by the central control unit 201 with the vibration pattern applied to the movable unit 100 by the vibrators 11 to 13, and determines whether the two vibration patterns match each other. If the two vibration patterns match each other, the central control unit 201 determines that the movable unit 100 is supported by the support member 200. If the two vibration patterns do not match each other, the central control unit 201 determines that the movable unit 100 is not supported by the support member 200, and performs processing for disconnecting the wireless communication. The state where the vibration patterns match each other does not indicate a state where the vibration patterns completely match each other, but indicates a state where a difference between the vibration patterns is less than or equal to a predetermined amount.

As described above, in a case where the support member 200 is erroneously connected, the support member 200 can disconnect the wireless communication from the erroneously-connected communication apparatus.

One or more functions of the exemplary embodiments described above can be implemented by processing in which a program is supplied to a system or an apparatus by using a network or recording medium, and the program is read and executed by the one or more processors in the system or the apparatus. The one or more functions can also be implemented by a circuit (e.g., an application specific integrated circuit (ASK)).

The exemplary embodiments described above are not seen to be limiting, and the components can be embodied by modifying the components without departing from the scope at an implementation stage. Any combination of a plurality of components disclosed in the exemplary embodiments described above is applicable. For example, some of the components described in the exemplary embodiments may be omitted. The components according to different exemplary embodiments may be combined as appropriate.

According to the present exemplary embodiment, it is possible to reduce the possibility that a connection for wireless communication cannot be established as intended by a user in a technique in which one of a plurality of replaceable communication apparatuses and an electronic apparatus that supports the communication apparatus perform wireless communication.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-086495, filed Apr. 27, 2018, which is hereby incorporated by reference herein in its entirety.

What is claimed is:

1. An electronic apparatus comprising:
a support unit;
a movement unit configured to move an apparatus supported by the support unit;
a communication unit;
a movement control unit configured to control the movement unit; and
a control unit,
wherein, in a situation where the communication unit establishes a connection for wireless communication to a communication apparatus,
the movement control unit controls the movement unit to move the apparatus supported by the support unit,
the control unit controls the communication unit to receive information about a movement of the communication apparatus to which the communication unit has established the connection for wireless communication, from the communication apparatus, and
the control unit determines, based on the received information about the movement of the communication apparatus, whether the apparatus that the support unit is supporting is the communication apparatus to which the communication unit has established the connection for wireless communication.

2. The electronic apparatus according to claim 1, wherein, in a situation where the control unit detects that the support unit is supporting an apparatus, the control unit controls the communication unit to perform processing to establish the connection for wireless communication to the communication apparatus.

3. The electronic apparatus according to claim 1, wherein, in a situation where the control unit determines that the apparatus that the support unit is supporting is not the communication apparatus to which the communication unit has established the connection for wireless communication, the control unit controls the communication unit to disconnect the connection for wireless communication to the communication apparatus.

4. The electronic apparatus according to claim 1, wherein, in a situation where the control unit determines that the apparatus that the support unit is supporting is the communication apparatus to which the communication unit has established the connection for wireless communication, the control unit continues the connection for wireless communication to the communication apparatus.

5. The electronic apparatus according to claim 1,
wherein after disconnecting the connection for wireless communication to the communication apparatus to which the communication unit has established the connection for wireless communication, the control unit performs processing for establishing a connection for wireless communication to another communication apparatus different from the communication apparatus.

6. The electronic apparatus according to claim 1,
wherein the control unit identifies the communication apparatus based on an identifier of the communication apparatus included in a packet that requires establishment of the connection for wireless communication.

7. The electronic apparatus according to claim 1, wherein the control unit determines whether the apparatus that the support unit is supporting is the communication apparatus to which the communication unit has established the connection for wireless communication, based on image data received from the communication apparatus via the communication unit before the movement unit moves the apparatus supported by the support unit, and image data received from the communication apparatus via the communication unit after the movement unit moves the apparatus supported by the support unit.

8. The electronic apparatus according to claim 1, wherein the communication apparatus has a spherical shape.

9. The electronic apparatus according to claim 1, wherein the movement by the movement unit is a rotational movement.

10. The electronic apparatus according to claim 1, wherein the information about the movement of the communication apparatus is a pattern of a vibration measured by the communication apparatus.

11. The electronic apparatus according to claim 1, wherein
the communication unit uses a Bluetooth® standard.

12. A control method for an electronic apparatus including a support unit, a movement unit configured to move an apparatus supported by the support unit, and a communication unit, the control method comprising:
controlling the movement unit to move the apparatus supported by the support unit in a situation where the communication unit establishes a connection for wireless communication to a communication apparatus;
controlling the communication unit to receive information about a movement of the communication apparatus to which the communication unit has established the connection for wireless communication, from the communication apparatus; and determining, based on the received information about the movement of the communication apparatus, whether the apparatus that the support unit is supporting is the communication apparatus to which the communication unit has established the connection for wireless communication.

13. A non-transitory computer readable storage medium storing a program for causing an electronic apparatus to execute a control method, electronic apparatus including a support unit and a communication unit, the control method comprising:

moving an apparatus supported by the support unit;

moving the apparatus supported by the support unit in a situation where the communication unit establishes a connection for wireless communication to a communication apparatus;

controlling the communication unit to receive information about a movement of the communication apparatus to which the communication unit has established the connection for wireless communication, from the communication apparatus; and determining based on the received information about the movement of the communication apparatus, whether the apparatus that the support unit is supporting is the communication apparatus to which the communication unit has established the connection for wireless communication.

14. An electronic apparatus comprising:

a movement unit configured to move a movement member;

a wireless communication unit;

a support unit configured to support a communication apparatus;

a movement control unit configured to control the movement unit; and a control unit, wherein, in a situation where the communication unit establishes a connection for wireless communication to the communication apparatus, the movement control unit controls the movement unit to move the movement member, wherein in a case where the control unit determines that the communication apparatus is moved by the movement member, the control unit controls the communication apparatus via the communication unit to cause the communication apparatus to capture an image, and wherein in a case where the control unit determines that the communication apparatus is not moved by the movement member, the control unit controls the communication unit to disconnect the connection for wireless communication to the communication apparatus.

* * * * *